United States Patent
Kraus et al.

(10) Patent No.: US 10,995,725 B2
(45) Date of Patent: May 4, 2021

(54) CONTROL DEVICE FOR A MULTIPLICITY OF ACTUATORS OF AN INTERNAL COMBUSTION ENGINE

(71) Applicant: INNIO Jenbacher GmbH & Co OG, Jenbach (AT)

(72) Inventors: Markus Kraus, Wiesing (AT); Johann Hirzinger-Unterrainer, Kossen (AT); Scott Mann, Jefferson, WI (US)

(73) Assignee: Innio Jenbacher GmbH & Co OG, Jenbach (AT)

( * ) Notice: Subject to any disclaimer, the term of this patent is extended or adjusted under 35 U.S.C. 154(b) by 17 days.

(21) Appl. No.: 16/311,971

(22) PCT Filed: Jul. 6, 2017

(86) PCT No.: PCT/EP2017/066949
§ 371 (c)(1),
(2) Date: Dec. 20, 2018

(87) PCT Pub. No.: WO2018/007528
PCT Pub. Date: Jan. 11, 2018

(65) Prior Publication Data
US 2019/0211794 A1    Jul. 11, 2019

(30) Foreign Application Priority Data
Jul. 8, 2016    (AT) .............................. A 50615/2016

(51) Int. Cl.
*F02P 5/15*    (2006.01)
*F02P 17/12*    (2006.01)
(Continued)

(52) U.S. Cl.
CPC ........ *F02P 5/1502* (2013.01); *F02D 41/0082* (2013.01); *F02D 41/28* (2013.01);
(Continued)

(58) Field of Classification Search
CPC .......... F02P 5/1502; F02P 17/12; F02P 5/045; F02P 7/02; F02P 2017/121; F02P 5/1512;
(Continued)

(56) References Cited

U.S. PATENT DOCUMENTS 4,984,167 A * 1/1991 Amano ................. F02D 41/345
                                                      701/102
5,461,315 A    10/1995 Kraus
(Continued)

FOREIGN PATENT DOCUMENTS

DE    10053598 A1    5/2002
EP    0601291 A1    6/1994
(Continued)

OTHER PUBLICATIONS

Austrian Search Report dated Apr. 10, 2017 which was issued in connection with ATA50615/2016 which was filed on Jul. 8, 2016.
(Continued)

*Primary Examiner* — Joseph J Dallo
(74) *Attorney, Agent, or Firm* — Fletcher Yoder, P.C.

(57) ABSTRACT

A control device for the selective control of a multiplicity of actuators of an internal combustion engine is provided. The control device includes a central control unit, and a multiplicity of actuators associated with the multiplicity of actuator controls, which are connected to the central control unit. Each actuator control, of the multiplicity of actuator controls, includes an address, so that the actuator controls are selectively controllable by the central control unit by means of the address. Also, each actuator control includes a comparator, which is configured to compare a signal, preferably a voltage or current signal, emitted by the central control unit with the address. The comparator also emits an activation signal via an activation line, if the comparison has resulted in a match of the signal with the address of the
(Continued)

respective actuator control within a window, preferably a voltage window (ΔV).

20 Claims, 7 Drawing Sheets

(51) Int. Cl.
| | |
|---|---|
| *F02D 41/00* | (2006.01) |
| *F02D 41/28* | (2006.01) |
| *F02D 45/00* | (2006.01) |
| *F02P 5/04* | (2006.01) |
| *F02P 7/02* | (2006.01) |
| *F02P 19/02* | (2006.01) |
| *F02P 3/04* | (2006.01) |
| *F02P 11/06* | (2006.01) |

(52) U.S. Cl.
CPC .............. *F02D 45/00* (2013.01); *F02P 5/045* (2013.01); *F02P 7/02* (2013.01); *F02P 17/12* (2013.01); *F02P 3/0414* (2013.01); *F02P 5/1512* (2013.01); *F02P 11/06* (2013.01); *F02P 19/023* (2013.01); *F02P 19/027* (2013.01); *F02P 2017/121* (2013.01); *Y02T 10/40* (2013.01)

(58) Field of Classification Search
CPC ...... F02P 19/027; F02P 3/0414; F02P 19/023; F02P 11/06; F02P 9/00; F02P 15/003; F02D 41/0082; F02D 41/28; F02D 45/00; Y02T 10/40
See application file for complete search history.

(56) References Cited

U.S. PATENT DOCUMENTS

| | | |
|---|---|---|
| 6,574,545 B2 | 6/2003 | Hartke et al. |
| 6,729,317 B2 | 5/2004 | Kraus |
| 6,766,243 B1 | 7/2004 | Haussmann et al. |
| 7,025,027 B2 | 4/2006 | Kraus et al. |
| 7,092,814 B1 | 8/2006 | Trenne et al. |
| 2004/0050355 A1 | 3/2004 | Harris et al. |
| 2010/0194279 A1 | 8/2010 | Barroso et al. |
| 2014/0046574 A1 | 2/2014 | Eisenbarth et al. |
| 2015/0053163 A1 | 2/2015 | Bolz |
| 2015/0308399 A1 | 10/2015 | Hoban et al. |

FOREIGN PATENT DOCUMENTS

| | | |
|---|---|---|
| EP | 0674102 A2 | 9/1995 |
| EP | 1171704 A1 | 1/2002 |
| EP | 1199470 A2 | 4/2002 |
| EP | 1222385 A1 | 7/2002 |
| WO | 9942722 A1 | 8/1999 |
| WO | 0176020 A1 | 10/2001 |

OTHER PUBLICATIONS

International Search Report and Written Opinion dated Jan. 12, 2017 which was issued in connection with PCT application No. PCT/EP2017/066949 which was filed on Jul. 6, 2017.
PCT International Search Report and Written Opinion; Application No. PCT/EP2017/066949; dated Jan. 12, 2017; 16 pages.

\* cited by examiner

CONTROL DEVICE FOR A MULTIPLICITY OF ACTUATORS OF AN INTERNAL COMBUSTION ENGINE

BACKGROUND

The invention relates to a control device for the selective control of a multiplicity of actuators of an internal combustion engine having the characteristics of the preamble of claim 1, an actuator in the form of an ignition device for a combustion chamber of an internal combustion engine having the characteristics of the preamble of claim 11 and an internal combustion engine having the characteristics of the preamble of claim 15.

BRIEF DESCRIPTION OF THE DISCLOSURE

According to the state of the art, the connection of the multiplicity of actuator controls with the actuators is implemented in such a way that the same number of necessary control and supply lines are separately run to each actuator. A plurality of actuators can be assigned to a shared actuator control. The actuator controls themselves are independently connected via a control line with the central control unit and via a supply line with a DC/DC converter.

Also ignition devices are known, which comprise measuring devices for the ignition voltage. The measuring signals are reported by each ignition device via a dedicated measuring line to the central control unit.

The above described multiplicity of required lines produces a high amount of cabling with the corresponding space requirement and the risk of miswiring.

The task of the invention is the provision of a class-specific control device, a class-specific actuator in the form of an ignition device and a class-specific internal combustion engine, in which the problems discussed above are avoided.

This task is solved with a control device having the characteristics of claim 1, an actuator in the form of an ignition device for a combustion chamber of an internal combustion engine having the characteristics of claim 11 and an internal combustion engine having the characteristics of claim 15. Advantageous embodiments of the invention are defined in the dependent claims.

Examples of such selectively by the control device controllable actuators are ignition devices and measuring devices (e.g. thermocouple or the like).

The invention can be used preferably at a stationary internal combustion engine or for marine applications or for mobile applications, such as so-called "non-road mobile machinery" (NRMM)—preferably respectively formed as a reciprocating piston engine (preferably gas engine). The internal combustion engine can be used as a mechanical drive, e.g. for operating compressor systems or coupled with a generator to a genset for generating electrical energy.

BRIEF DESCRIPTION OF THE DRAWINGS

Exemplary embodiments of the invention will be discussed with reference to the Figures. The drawings in detail.

DETAILED DESCRIPTION

In the exemplary embodiments of the FIGS. 1 to 4 an automatic addressing of each actuator control 2 is achieved by virtue of the very fact that they are connected in series in relation to the first control line 3, as this will be explained below.

Figure 6:
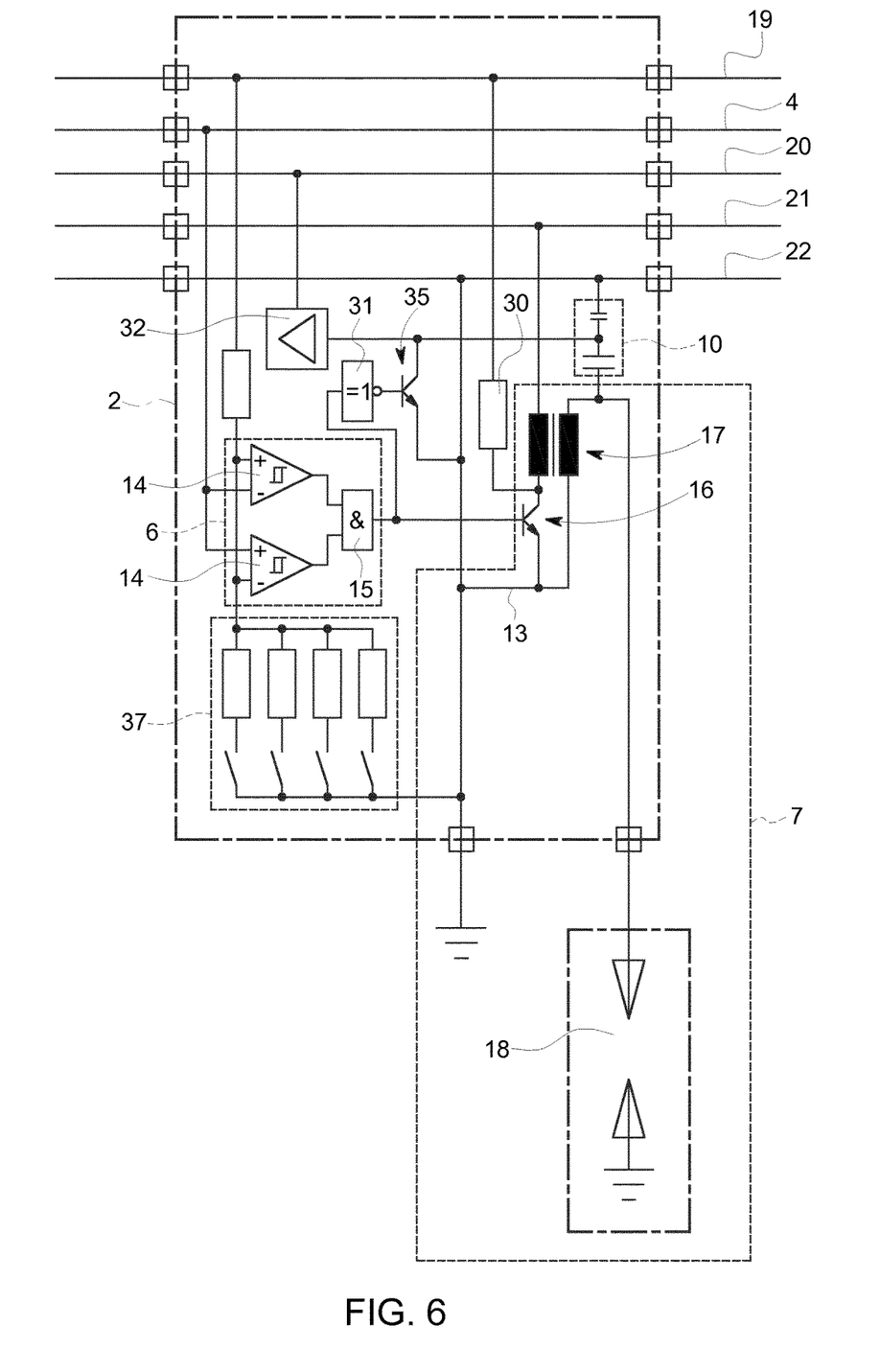
FIG. 6 shows another variant to FIG. 2

In the exemplary embodiment of FIG. 6 each actuator control is provided with a preset address by means of a switch 37.

Figure 1A:
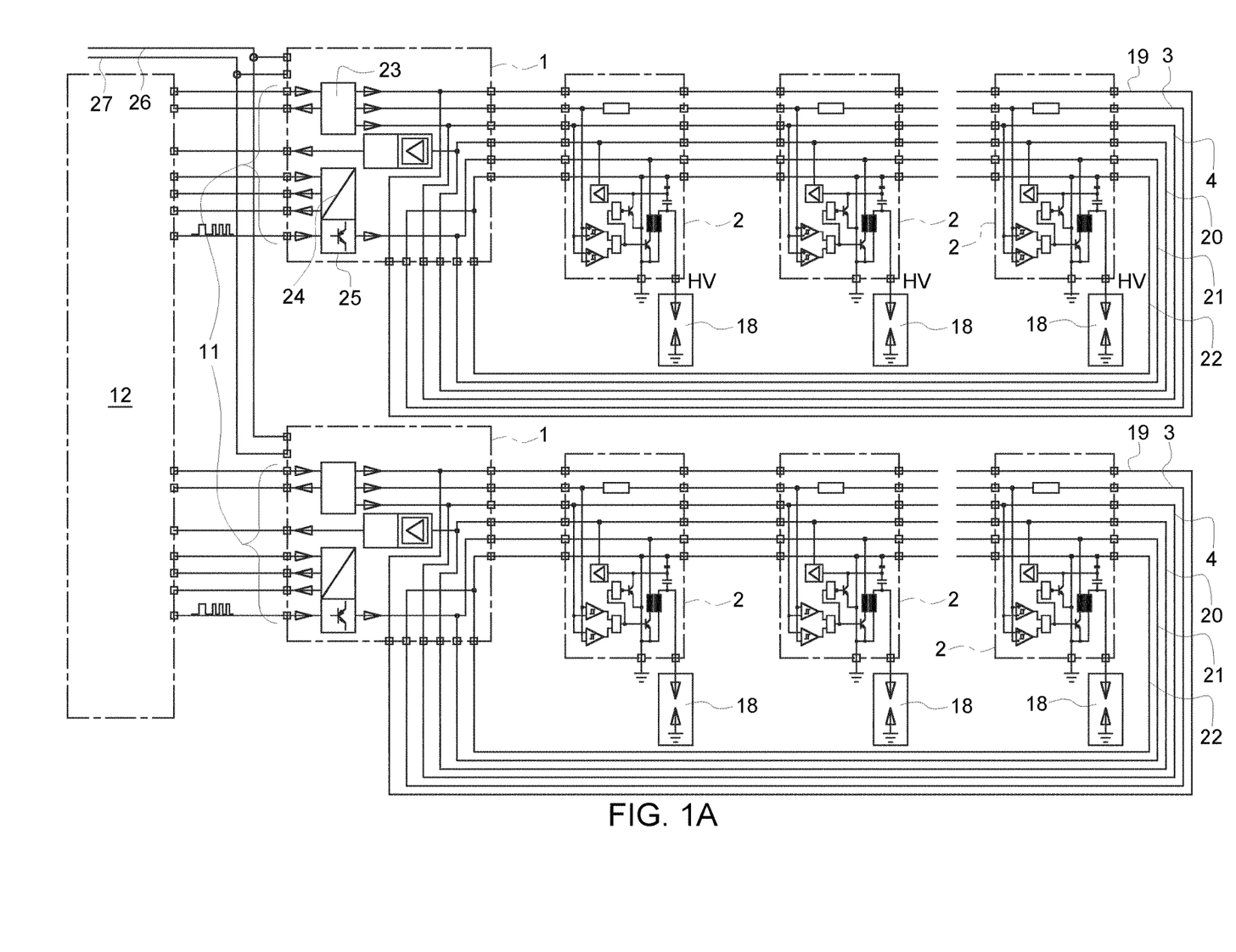
FIG. 1A, 1B show two representations of control devices according to the invention in conjunction with actuators of an internal combustion engine
Figure 5:
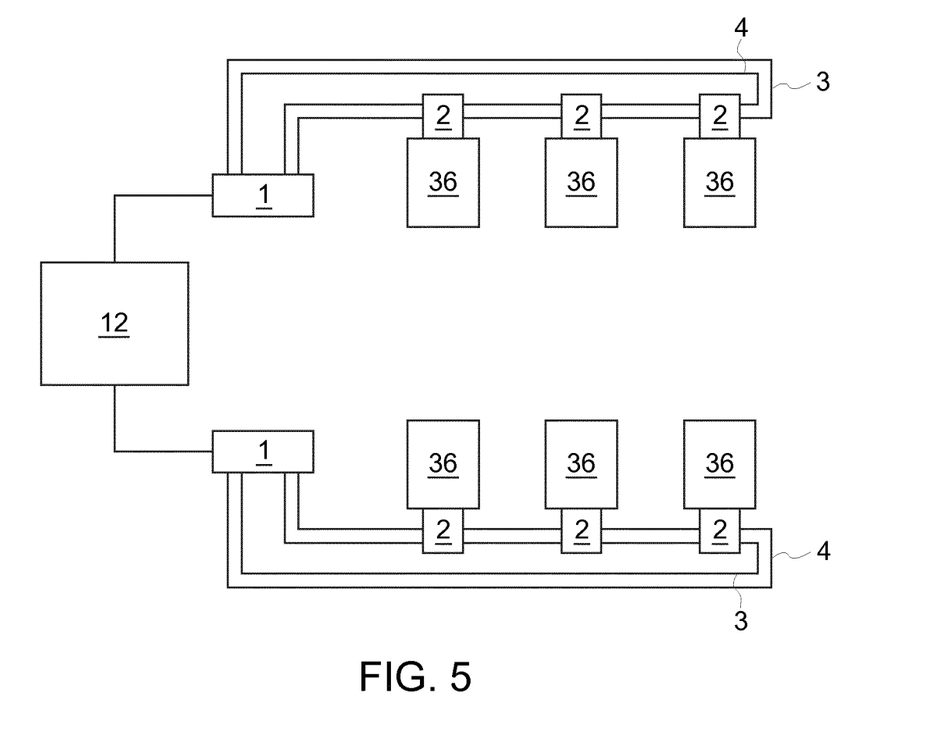
FIG. 5 shows a representation of an internal combustion engine according to the invention

FIG. 1A shows an exemplary embodiment of the invention, wherein the actuators to be controlled by the control device according to the invention are made here in the form of exemplary six ignition devices 7 for the combustion chambers of an internal combustion engine (not shown—see FIG. 5) and wherein two central control units 1 are provided for the six ignition devices 7. Each ignition device 7 is provided with an associated actuator control 2.

The central control units 1 are each connected via a control input 11 with a control 12 of the internal combustion engine. Furthermore, each central control unit 1 is connected with a 24 volt DC line 26 (of course, a different voltage could be provided) and a ground 27. Each central control unit 1 comprises an ignition order module 23 (connected to a 24 volt supply line 19—of course a different voltage could be provided, a first control line 3 and a second control line 4), by which the sequence of the activation of the ignition device 7 is settable. Furthermore, a DC/DC converter 24 and a PWM module 25 (pulse-width modulated module, connected with the power supply for the primary side 21) are provided respectively.

Figure 1B:
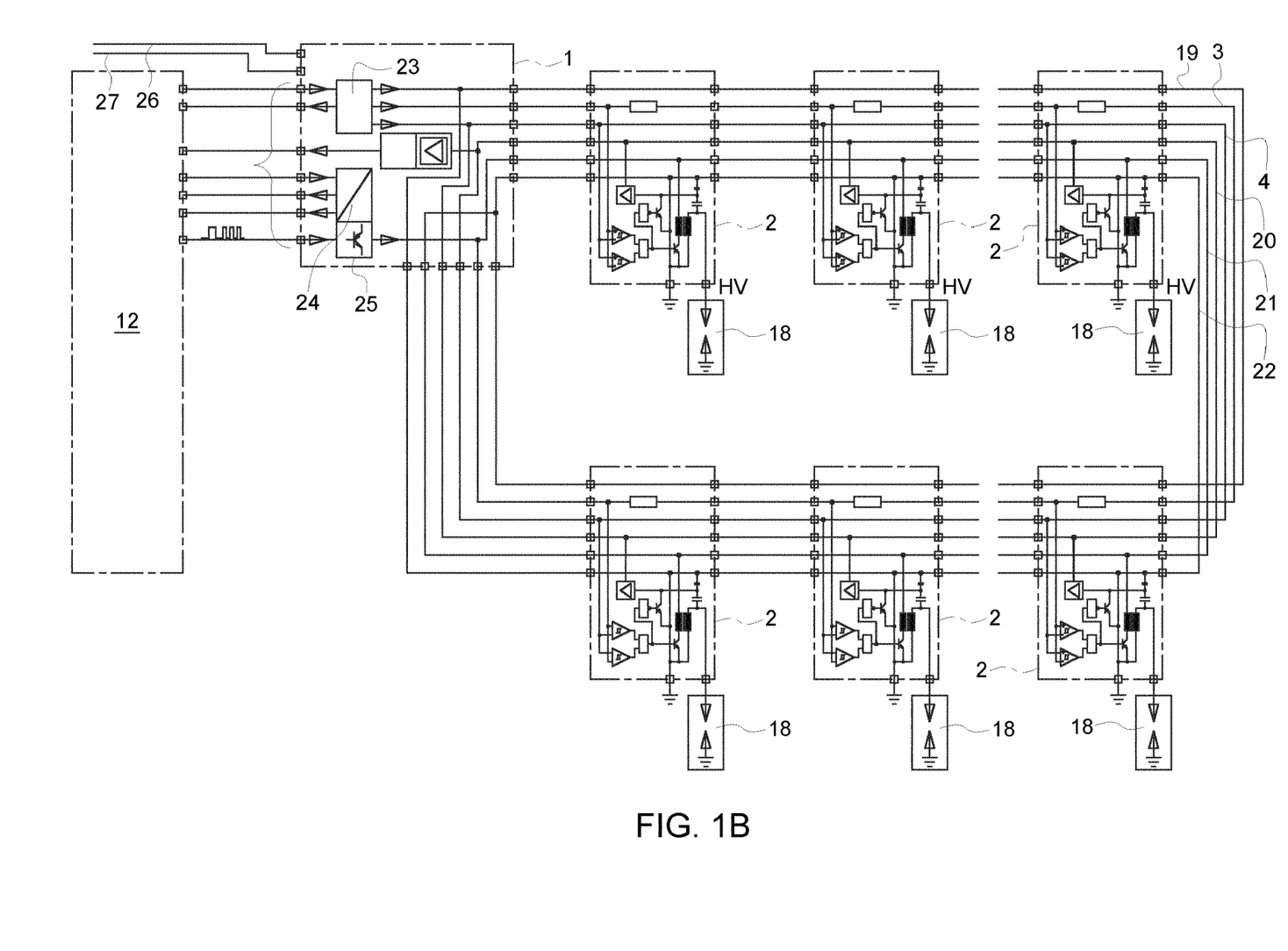

The exemplary embodiment of FIG. 1B differs from that of FIG. 1A only by the fact that here a single central control unit 1 is provided for all actuators of the internal combustion engine. This is possible, as long as the time interval between successive desired activations of selected actuators is long enough.

Unlike shown in FIGS. 1A and 1B, it is not necessary that the lines 3, 4, 19, 20, 21, 22 lead back to the central control unit(s) 1, instead the line 3 can be connected to ground and the remaining lines 4, 19, 20, 21, 22 can be kept open.

Figure 2:
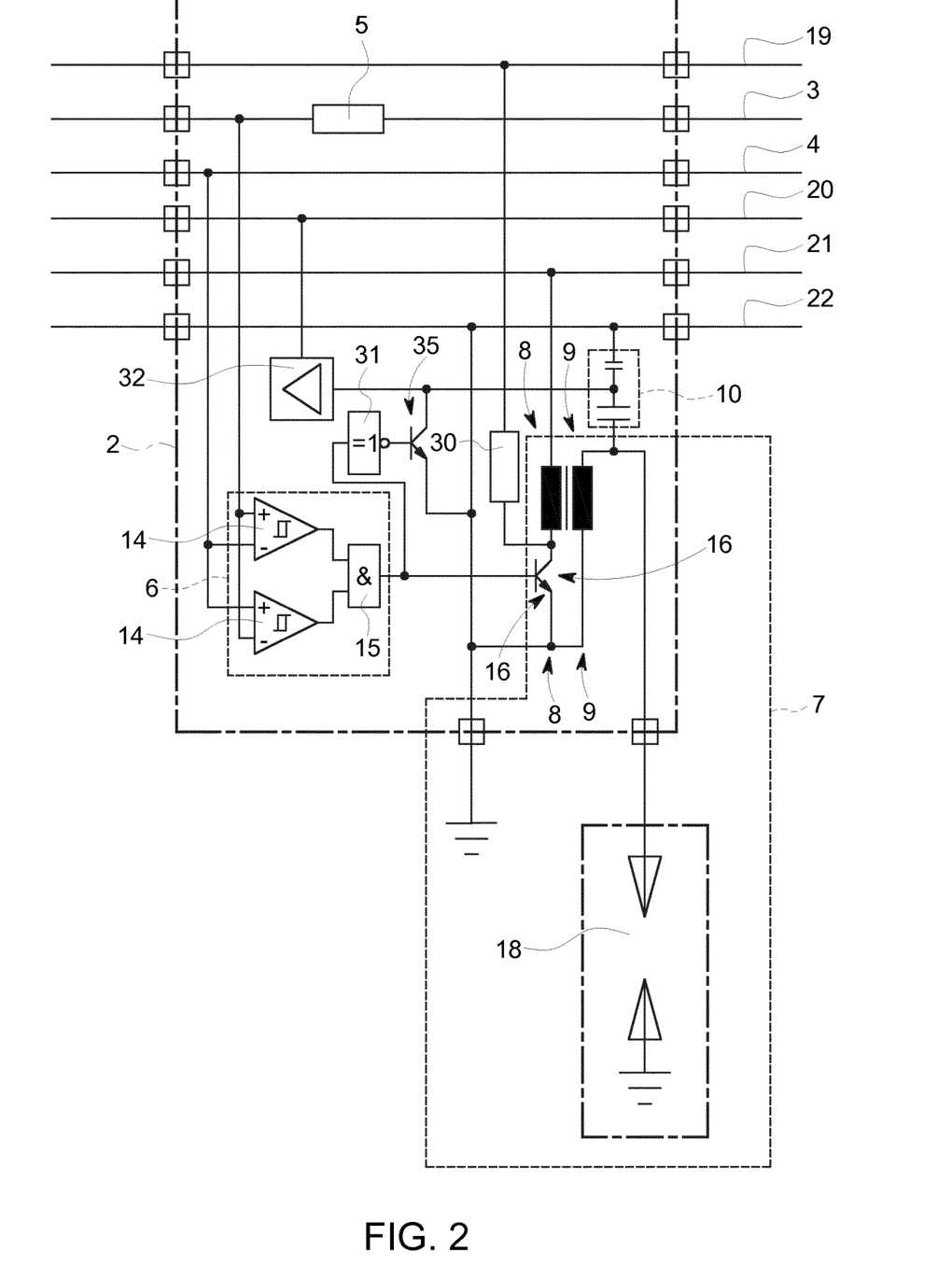
FIG. 2 shows a detail to FIG. 1

FIG. 2 shows a detail to FIGS. 1A and 1B. Recognizable is an example of a single actuator control 2, which is connected to an ignition device 7 of a combustion chamber 36, not shown, of an internal combustion engine. Structurally the actuator controller 2 and parts of the ignition device 7 can be designed in one unit as indicated in FIG. 2. Specifically, for example, all the remaining parts of the ignition device 7 can structurally be designed together with the actuator control 2 apart from a spark plug implementing the spark gap. A structural separation would, of course, also be possible.

In the exemplary embodiment shown, the actuator controller 2 is connected to the central control unit 1 via six lines 19, 3, 4, 20, 21 and 22. The actuator controller 2 is electrically connected in series with respect to the line 3 and is electrically connected in parallel with respect to the remaining lines 4, 19, 20, 21, 22.

A selective control of the shown actuator control 2 by the central control unit 1 can take place as follows:

Each actuator control 2 comprises a voltage divider 5 (preferably an ohmic resistor) in the first control line 3. The electrical current fed via the central control unit 1 into the first control line 3 with specific amperage thus leads to a voltage drop determined by the voltage divider 5 before and after each actuator control 2 (preferably all actuator controls 2 comprise the same voltage divider 5, so that an equal voltage drop results everywhere).

If, for example, eight actuator controls 2 are connected in series with respect to the first control line 3 and each actuator control 2 comprises a voltage divider 5 in the form of an ohmic resistor of 40 ohms, and the central control unit 1 feeds an electric current with an amperage of 20 milliampere into the control line 3, a voltage drop of 800 millivolts is obtained with respect to the first control line 3 via each actuator control 2, and a voltage drop of 6.4 volts across all eight actuator controls 2.

In each actuator control 2 a comparator 6 is provided, which is connected on the one hand to the first control line 3 and taps the voltage $V_1$ before (as shown) or after the voltage divider 5 and which on the other hand is connected to the second control line 4. In the actuator control 2, which is arranged directly after the central control unit 1, the tapped voltage $V_1$ in the above numerical example (compared to a common ground of all the actuator controls 2) is 6.4 volts, in the next actuator control 2 it would be 5.6 volts, etc.

The comparator 6 is designed to output an activation signal to a switching device 16 of the ignition device 7 (generally: the actuator) via an activation line 13, if the voltage $V_2$ present at the second control line 4 is within a voltage window $\Delta V$, which is disposed around the voltage $V_1$ tapped at the first control line 3.

A selective control of the actuator control 2 disposed immediately after (along the first control line 3) the central control unit 1 would occur, for example, when the central control unit 1 applies a voltage to the second control line 4, which is within a certain voltage window $\Delta V$, disposed around 6.4 volts, e.g. 0.4 volts (i.e. between 6.6 volts and 6.2 volts).

A selective control of the actuator control 2 disposed immediately after (along the first control line 3) the first actuator control 2 would occur, for example, when the central control unit 1 applies a voltage to the second control line 4, which is within a certain voltage window $\Delta V$, disposed around 5.6 volts, e.g. 0.4 volts (i.e. between 5.8 volts and 5.4 volts), etc.

The size of the voltage window $\Delta V$ is determined by the component tolerances of the voltage divider 5 and the comparator 6 and the amperage of the input current as well as the tolerance of the predetermined voltage $V_2$ and a selectable signal-to-noise ratio for the signal reliability. It can be determined by tests.

The comparator 6 can, for example, be designed in such a way that it has two mirror-inverted connected Schmitt triggers 14, the outputs of which are connected to an AND gate 15. The one Schmitt trigger 14 outputs a HI signal (logical one) when the voltage $V_1$ tapped at the first control line 3 is greater than or equal to the voltage $V_2$ measured at the second control line 4 and an LO signal (logical zero) when the voltage $V_1$ tapped at the first control line 3 is smaller than the voltage $V_2$ measured at the second control line 4. The other Schmitt trigger 14 works in reverse, i.e. it outputs an HI signal (logical one) when the voltage $V_1$ tapped at the first control line 3 is less than or equal to the voltage $V_2$ measured at the second control line 4 and an LO signal (logical zero) when the voltage $V_1$ tapped at the first control line 3 is greater than the voltage $V_2$ measured at the second control line 4. Modifications of this circuit are conceivable of course, such as the output of an HI signal by the one Schmitt trigger 14, if the voltage $V_1$ tapped at the first control line 3 is greater than the voltage $V_2$ measured at the second control line 4 and an LO signal (logical zero) when the voltage $V_1$ tapped at the first control line 3 is less than or equal to the voltage $V_2$ measured at the second control line 4.

The AND gate 15 downstream of the Schmitt triggers 14 only outputs an activation signal via the activation line 13 when both Schmitt triggers 14 emit an HI signal, which of course can only be the case, if $V_1=V_2$ (within window $\Delta V$) is true.

The activation line 13 is connected to a switching element 16 (here: transistor) of the ignition device 7. An activation signal, which is received via the activation line 13, activates the switching element 16, whereby energy can be supplied to an ignition coil 17 of the ignition device 7 via the power supply 21 for the primary side 8 of a high-voltage transformer of the ignition device 7, which causes through a spark gap formed by the secondary side 9 of the high-voltage transformer of the ignition device 7 and an electrode gap 18 of the ignition device 7 the formation of an ignition spark when a signal of the PWM module 25 is present at the energy supply 21 for the primary side 8.

Whether an activation of the actuator control 2 has taken place can be controlled by the central control unit 1 via a confirmation module 30, which is designed to be queried by the central control unit 1 and to provide information on a given output of an activation signal via the activation line 13. For this purpose, in the example shown, a current from the 24 volt supply line 19 is applied to ground via the switching element 16. This current is measured in the central control unit 1. If the measured amperage is below a predetermined threshold value, no activation of any of the actuator controls 2 connected to the central control unit 1 took place. If the measured amperage is above a predetermined threshold value, more than one activation of any of the actuator controls 2 connected to the central control unit 1 took place. If the measured amperage is within the window defined by the two predetermined threshold values, exactly one activation of any of the actuator controls 2 connected to the central control unit 1 took place. Only in this case, a signal is emitted in the central control unit 1 via the PWM module 25 via the power supply 21 for the primary side 8 and the ignition process is initiated. Thus, in the event of a faulty simultaneous activation of two actuator controls 2 it is prevented that an actuation of the actuators takes place, which would lead to misfiring when the actuators are designed as ignition devices 7. If, on the other hand, it is detected that no activation has taken place, this can be reported as an error to the control 12 of the internal combustion engine.

On the secondary side 9 of the high-voltage transformer of the ignition device 7 a voltage divider 10 (here: capacitive voltage divider, alternatively: for example, ohmic voltage divider) of a measuring device 10, 32 is disposed, by means of which the ignition voltage can be measured. The measuring device 10, 32 can be activated via the switch 31 and the switching element 35 by an activation signal and, upon activation, can report the measured ignition voltage to the central control unit 1 via a signal amplifier 32 via the measuring line 20. By means of the selective selection by the central control device 1, a multiplexing of the measuring signals of all the actuators can take place via a single measuring line 20.

Figure 3:
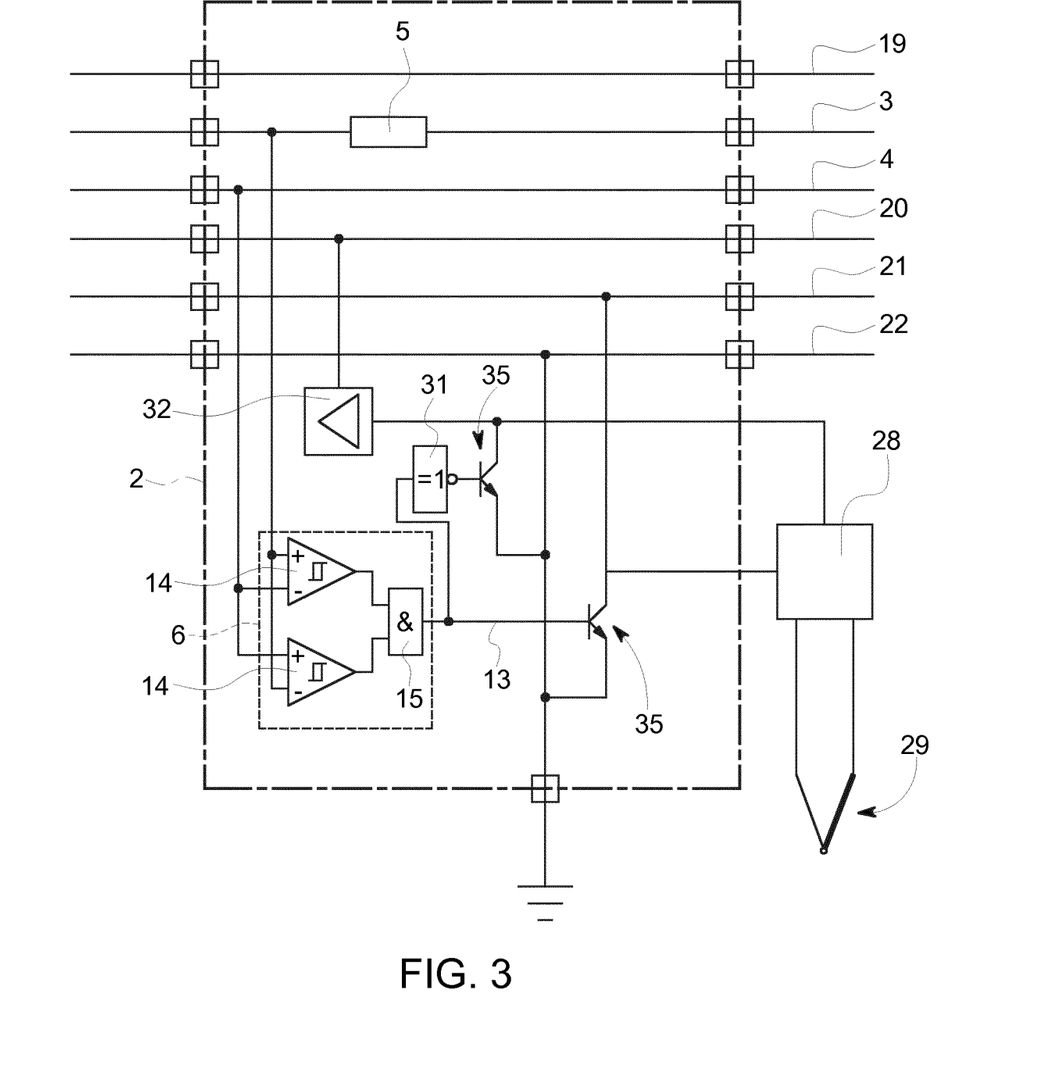
FIG. 3 shows a variant to FIG. 2

FIG. 3 shows analogously to FIG. 2 an actuator control 2, which is not connected to an actuator in the form of an ignition device 7, but instead to an actuator for actuating a measuring device (here in the form of a thermocouple 29). Upon activation of the switching device 35 (as described above with respect to FIG. 2), the measuring result received by the measuring device is fed to the central control unit 1 via the measuring transducer 28, the signal amplifier 32 and the measuring line 20. The measuring transducer 28 and signal amplifier 32 can, of course, also be designed in integrated form.

Figure 4:
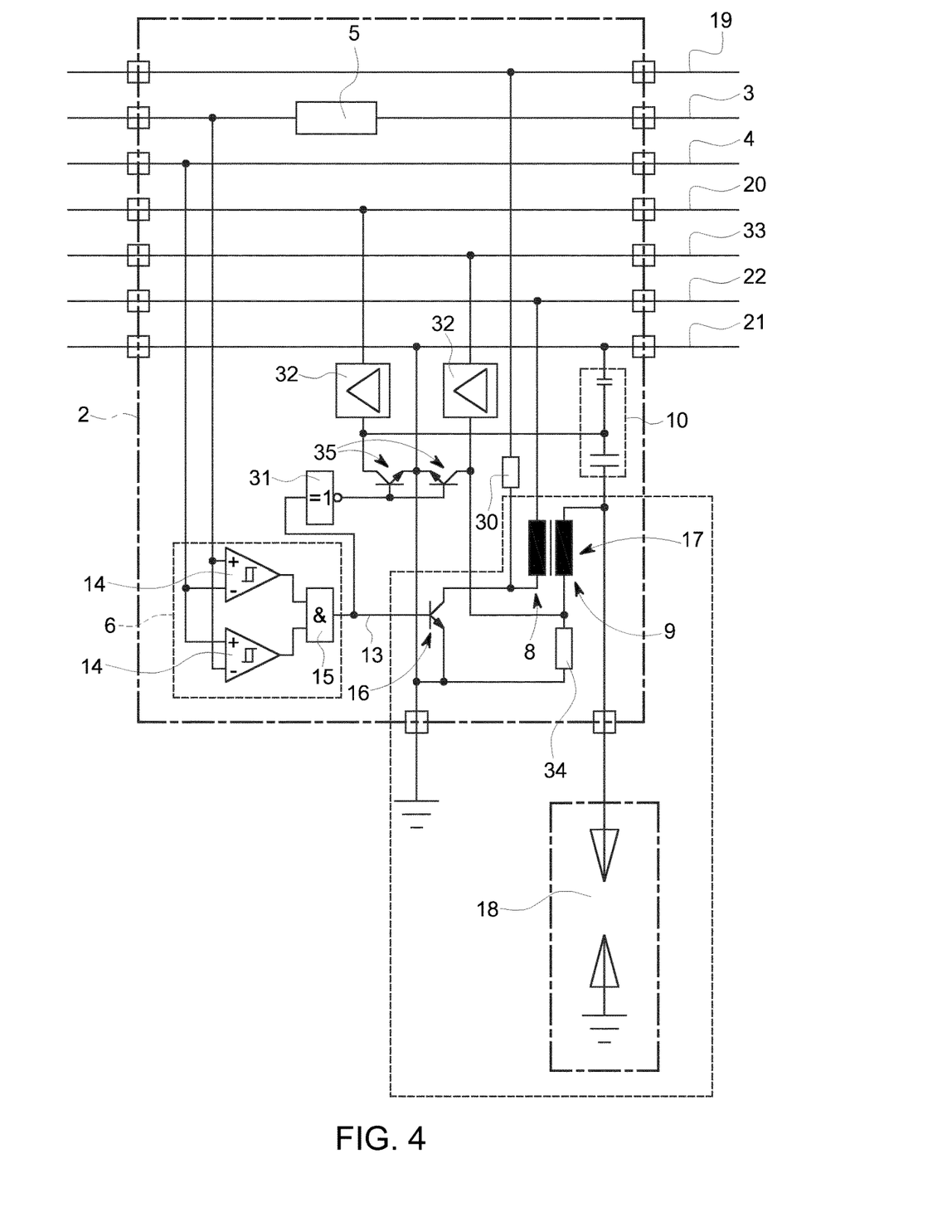
FIG. 4 shows another variant to FIG. 2

FIG. 4 shows a further alternative to FIG. 2, whereby the actuator controlled by the actuator control 2 is also designed as an ignition device 7, but the actuator control 2 comprises an additional functionality which permits energy control of the ignition device 7. For this purpose, in comparison to the exemplary embodiment of FIG. 2, a further line 33 to which the actuator is electrically connected in parallel, a measuring device 34 for the ignition spark current (which is the current required for the formation of the ignition spark) and a signal amplifier 32 switchable by a switching device 35 are provided.

With the selective control of the actuator control 2 by the central control unit 1, a measuring result for the ignition spark current measured by the measuring device 34 is reported to the central control unit 1 via the signal amplifier 32 activated by the selective control by means of the switching device 35. This one or a control 12 of the internal combustion engine connected to the control unit 1 is designed to regulate the power supply of the ignition device 7 by means of the PWM module 25 and the power supply 21 for the primary side depending on the measuring result in such a manner that a desired ignition spark current is produced.

A combination of the exemplary embodiments shown in FIG. 2 and FIG. 3 or FIG. 3 and FIG. 4 is also possible.

The exemplary embodiment of FIG. 6 differs from those of FIGS. 1 to 4 only in that here an address in the form of a selectable reference voltage for each actuator control 2 is to be preset by means of a switch 37 (for example, a DIP switch, soldering bridge, etc.). If a voltage is applied by the central control unit 1 to the control line 4, which coincides with the preset address, this can be detected by the comparator 6 and the activation of the associated actuator is carried out as described in the exemplary embodiments of FIGS. 1 to 4.

In the exemplary embodiment shown, the switch 37 is designed in the form of a DIP switch with exemplary four contacts, resulting in sixteen different reference voltages, depending on which contacts are opened or closed. How many contacts are required depends, of course, on the number of actuator controls 2 to be distinguished.

As an alternative to openable and closable contacts, of course, also hard-soldered contacts could be provided.

Although in all exemplary embodiments, the selection is made by applying a voltage, this could be done also by applying a current. In this case, however, the current must be converted again into a voltage upstream of the comparator.

What we claim is:

1. A system, comprising:
a control device configured to selectively control a multiplicity of actuators of an internal combustion engine, comprising:
a central control unit; and
a multiplicity of actuators associated with the multiplicity of actuator controls, which are connected to the central control unit;
wherein each actuator control of the multiplicity of actuator controls comprises an address, and the actuator controls are selectively controllable through the central control unit via the address for each actuator control; and
wherein each actuator control comprises a comparator, wherein the comparator is configured to:
compare a signal emitted by the central control unit relative to a window about the address of the respective actuator control to obtain a comparison; and
emit an activation signal via an activation line, if the comparison has resulted in a match of the signal with the window about the address of the respective actuator control.

2. The system of claim 1, wherein each actuator control comprises a switch configured to set the address via a selectable reference voltage characteristic for the actuator control.

3. The system of claim 1, wherein
a first and a second control line are provided to connect the central control unit and the multiplicity of actuator controls, and the multiplicity of actuator controls are electrically connected in series with respect to the first control line and are electrically connected in parallel with respect to the second control line;
wherein the central control unit is configured to allow current to flow at a given amperage in the first control line and to apply a freely selectable voltage (V2) within a specified voltage range to the second control line;
each actuator control of the multiplicity of actuator controls comprises:
a voltage divider disposed in the first control line for the implementation of the address; and
the comparator, wherein the comparator is connected with the first control line and taps a voltage (V1) before or after the voltage divider, the comparator is connected with the second control line, and the comparator is configured to emit the activation signal via the activation line, if the freely selectable voltage (V2) applied to the second control line is within a voltage window ($\Delta$V) disposed around the voltage (V1) tapped at the first control line, wherein the window comprises the voltage window ($\Delta$V) and the voltage (V1) corresponds to the address of the respective actuator control.

4. The system of claim 3, wherein the voltage divider comprises an ohmic resistor.

5. The system of claim 3, wherein the comparator comprises two Schmitt triggers that are mirror-inverted connected, wherein outputs of the two Schmitt triggers are connected with an AND gate.

6. The system of claim 1, wherein each actuator control comprises a confirmation module configured to be queried by the central control unit and to provide information on a given output of the activation signal via the activation line.

7. The system of claim 3, wherein the central control unit is configured to check whether at least the first control line is electrically uninterrupted.

8. The system of claim 1, wherein the central control unit comprises a control input configured to couple to a control of an internal combustion engine.

9. The system of claim 2, wherein at least one of the actuator controls comprises a sensor configured to be activated via the switch by a sensor activation signal for measuring of a selected property of a respective actuator of the multiplicity of actuators, wherein one or more signals of the sensor are configured to be supplied via a measuring line of the central control unit.

10. The system of claim 1, wherein at least one of the multiplicity of actuators comprises an ignition device for a combustion chamber of an internal combustion engine, wherein the ignition device comprises:
   a high-voltage transformer with a primary side and a secondary side, wherein the primary side is connected with a high-voltage source and the secondary side is connected with a spark gap for the formation of an ignition spark; and
   a switching device connected with the activation line of an actuator control of the multiplicity of actuator controls.

11. The system of claim 1, wherein at least one of the multiplicity of actuators comprises an ignition device for a combustion chamber of an internal combustion engine, wherein the ignition device comprises:
   a high-voltage transformer with a primary side and a secondary side, wherein the primary side is configured to couple with a high-voltage source and the secondary side is connected with a spark gap for the formation of an ignition spark;
   a sensor provided on the secondary side, wherein the sensor comprises a voltage divider that makes an ignition voltage measurable, wherein the sensor is configured to be activated by a sensor activation signal to measure the ignition voltage; and
   a signal amplifier configured to release the ignition voltage measured by the sensor.

12. The system of claim 11, wherein an actuator control of the multiplicity of actuator controls comprises for energy control of an ignition spark current of the ignition device an additional line, with which the ignition device is electrically connected in parallel and the actuator control comprises the sensor for the ignition spark current and the signal amplifier that is switchable by a switching device.

13. The system of claim 1, comprising an internal combustion engine having the control device, wherein the multiplicity of actuators are connected with the control device, and each actuator of the multiplicity of actuators is connected with an actuator control of the multiplicity of actuator controls.

14. The system of claim 1, comprising an internal combustion engine having the control device, wherein one of the multiplicity of actuators is an ignition device, or is for actuating a sensor.

15. The system of claim 8, comprising the internal combustion engine having the control device, wherein the central control unit of the control device is connected via the control input with the control of the internal combustion engine.

16. A system, comprising:
   a controller configured to selectively control a multiplicity of actuators of an internal combustion engine, comprising:
   a multiplicity of actuator controls associated with the multiplicity of actuators, wherein each actuator control of the multiplicity of actuator controls comprises an address and a comparator, wherein the comparator is configured to:
      compare a signal relative to a window about the address of the respective actuator control to obtain a comparison; and
      emit an activation signal via an activation line, if the comparison has resulted in a match of the signal with the window about the address of the respective actuator control.

17. The system of claim 16, comprising the internal combustion engine having the controller, the multiplicity of actuators, and the multiplicity of actuator controls.

18. The system of claim 16, wherein at least one of the multiplicity of actuators comprises an ignition device or a sensor.

19. A system, comprising:
   an actuator control of an actuator of an internal combustion engine, wherein the actuator control comprises an address and a comparator, wherein the comparator is configured to:
      compare a signal relative to a window about the address of the actuator control to obtain a comparison; and
      emit an activation signal via an activation line, if the comparison has resulted in a match of the signal with the window about the address of the actuator control.

20. The system of claim 19, comprising the actuator, wherein the actuator comprises an ignition device or a sensor.

* * * * *